United States Patent [19]

Morita et al.

[11] Patent Number: 5,204,582

[45] Date of Patent: Apr. 20, 1993

[54] CATHODE RAY TUBE WITH AN OXYSULFIDE PHOSPHOR

[75] Inventors: Yasukazu Morita, Mobara; Yasuhiko Uehara, Chiba; Hiromichi Yamada, Hino; Yoshimasa Hara, Nagoya, all of Japan

[73] Assignees: Hitachi, Ltd., Tokyo; Brother Industries, Limited, Aichi, both of Japan

[21] Appl. No.: 551,010

[22] Filed: Jul. 11, 1990

[30] Foreign Application Priority Data

Jul. 12, 1989 [JP] Japan .................................. 1-177937

[51] Int. Cl.⁵ .............................................. H01J 29/20
[52] U.S. Cl. .............................. 313/468; 252/301.4 S
[58] Field of Search ................... 313/468; 252/301.4 S

[56] References Cited

U.S. PATENT DOCUMENTS 4,726,675  2/1988  Shiota et al. ................ 313/468 X
4,755,715  7/1988  Berkstresser et al. .............. 313/468

OTHER PUBLICATIONS

"Optical Characteristics of Cathode Ray Tube Screens", JEDEC Publication No. 16-B, p. 50, Aug. 1971.

*Primary Examiner*—Palmer C. DeMeo
*Attorney, Agent, or Firm*—Antonelli, Terry, Stout & Kraus

[57] ABSTRACT

There are disclosed a europium and terbium-coactivated phosphor having chemical composition formula $$(M_{1-x-y}Eu_xTb_y)_nD$$

wherein M represent Y or Lu, D represents $(Al_{1-z}Ga_z)_5O_{12}$ in which z is defined by $0 \leq z \leq 1$, or $O_2S$, x is defined by $0.0003 \leq x \leq 0.001$, y is defined by $0.0003 \leq y \leq 0.002$ and n is 2 or 3, and wherein when D is $(Al_{1-z}Ga_z)_5O_{12}$, M is Y, n is 3 and y is defined by $0.001 \leq y \leq 0.02$, or when D is $O_2S$, n is 2, y is defined by $0.0003 \leq y \leq 0.005$; a cathode ray tube for color copy or color print coated with said europium and terbium-coactivated phosphor; and a copy (printing) unit using said cathode tube.

3 Claims, 2 Drawing Sheets

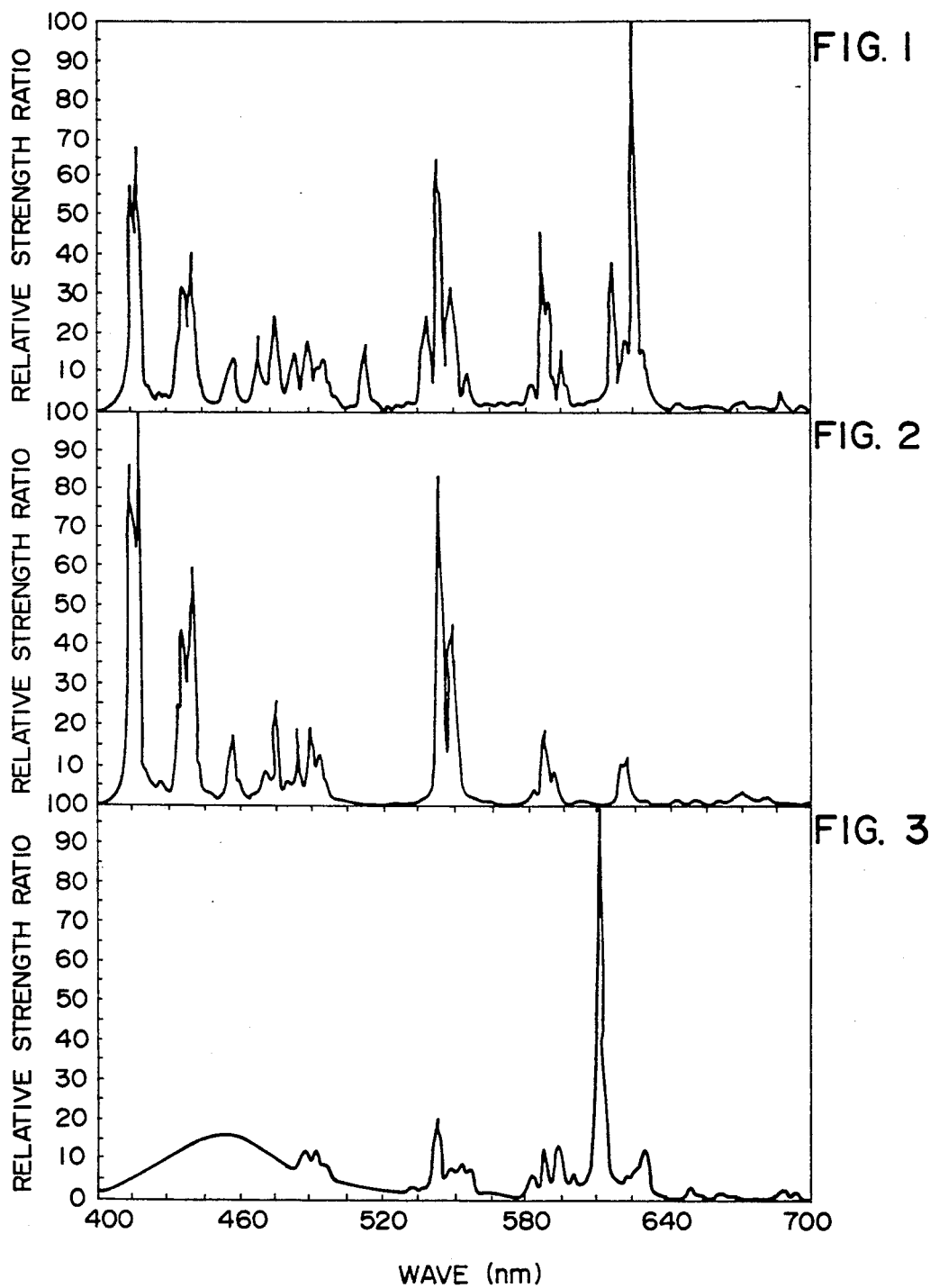

CATHODE RAY TUBE WITH AN OXYSULFIDE PHOSPHOR

BACKGROUND OF THE INVENTION

1. Field of the Invention

This invention relates to a phosphor for a cathode ray tube, in particular, a phosphor for a cathode ray tube used as a light source for color copying or color printing, or, in particular, a phosphor having uniform and bright-light emission energy strength, a cathode ray tube using said phosphor and a color copying (or printing) unit using said cathode ray tube.

2. Related art

In an image processing system for a color copying machine, a color printer, etc., it has been general practice to obtain a copy image by imagewise exposing a photosensitized material formed on a photosensitive drum, etc., to form an electrostatic latent image, developing/transfering the electrostatic latent image with a toner, and repeating this procedure for color elements three times. However, a new method called cycolor has been recently developed.

This method is carried out by exposing a special film coated with numerous ultrafine particles reactive to red, green and blue lights, transfering a resultant image to a copying paper and fixing it, i.e. the development and transfer are carried out in one process (S. Lu et. al., Laser-Addressed Liquid Crystal Light Modulators for Color Electronic Imaging with Mead Microencapsuled Paper, 1987 Society for Information Display International Symposium Digest of Technical Papers, pp. 367-370, May 1987).

The light source for the above cycolor method is required to fulfill the following three requirements.

(1) The light source is required to have a constant light emission energy strength, a constant distribution of the energy strength and a constant-height peak in each of regions suitable for spectral sensitivity in regions of blue, green and red of a special film.

(2) The light source is required to have a light emission energy strength and peak each in regions suitable for blue, green and red filters.

(3) The light source is required not to cause non-uniform light emission.

When a laser beam is used as a light source, the compaction of a color copying (or printing) unit is limited. Therefore, the use of a cathode ray tube is taken into consideration as a substitute light source. As a cathode ray tube to fulfill the above requirements (1) and (2), there is a cathode ray tube having a phosphor surface formed by mixing blue, green and red-emitting phosphors and coating the mixture. For example, one cathode ray tube has a phosphor surfacer formed of a mixture of equal amounts of ZnS:Ag.Al as a blue-emitting phosphor, $Y_3Al_5O_{12}$:Tb as a green-emitting phosphor and $Y_2O_3$:Eu as a red-emitting phosphor, and such a cathode ray tube has a light emission energy strength as shown in FIG. 3. This cathode ray tube nearly fulfills the above requirements (1) and (2) concerning the light emission energy strength, distribution and peak, etc., in the blue region (wavelength 400-500 nm), green region (wavelength 520-580 nm) and red region (wavelength 600-700 nm). However, when a color copy was made by using this cathode ray tube, it was found that this cathode ray tube has defects that an image non-uniformity corresponding to a non-uniform mixture of the phosphors is caused and that a reduction in resolution occurs. This phenomenon could not be removed even if the mixture was highly homogenized to improve the mixture uniformity. And, it has been found that this phenomenon is caused by uneven distributions of the particle sizes and aggregates of the phosphors, and that no cathode ray tube can be put to practical use as far as a mixture of phosphors is used.

Then, a study was made of a cathode ray tube having a phosphor surface formed of a single phosphor having a light emission energy distribution in each color region. As a phosphor having a light emission energy distribution in blue, green and red regions, there are white-emitting phosphors, and a terbium-activated, yttrium oxysulfide ($Y_2O_2SL$:Tb) phosphor having a JEDEC register No. P45 is known. When a cathode ray tube having a phosphor surface formed by coating this phosphor was used to make color copies, the resultant image quality showed that the image non-uniformity caused by the use of the foregoing mixture of phosphors was overcome, and that the resolution was also good. In this case, however, the light emission energy distribution was as shown in FIG. 2, and there was imbalance in the distribution of light emission energy strength, i.e. the strength in the red region was extremely low. It has thus been found that such a cathode ray tube is practically undesirable. In this $Y_2O_2S$:Tb phosphor, the light emission energy distribution can be changed by increasing or decreasing the concentration of Tb, an activator. However, even if such a change is possible, the light emission strength in the red region cannot be improved.

Further, other single white-emitting phosphors which have been commercially available were studied. However, none of such phosphors could give a cathode ray tube having satisfactory properties.

SUMMARY OF THE INVENTION

The present inventors have made a diligent study to overcome the above prior art problems and provide a phosphor for a cathode ray tube useful as a light source for color image processing, a cathode ray tube using said phosphor, and a color image processing unit using said cathode ray tube. As a result, it has been found that the above problems can be overcome by using, as a phosphor, a substance of the following chemical composition formula, $$(M_{1-x-p}Eu_xTb_y)_nD$$

wherein M represent Y (yttrium) or Lu (lutetium), D represents $(Al_{1-z}Ga_z)_5O_{12}$ in which z is defined by $0 \leq z \leq 1$, or $O_2S$, z is defined by $0.003 \leq x \leq 0.01$, y is defined by $0.0003 \leq y \leq 0.02$ and n is 2 or 3, and wherein when D is $(Al_{1-z}Ga_z)_5O_{12}$, M is Y, n is 3 and y is defined by $0.001 \leq y \leq 0.02$, or when D is $O_2S$, n is 2, y is defined by $0.0003 \leq y \leq 0.005$.

That is, when a cathode ray tube having a phosphor of the above formula was used as a cathode ray tube in the constitution of this invention, it was possible to provide a cathode ray tube having uniform and bright-light emission strength suitable as a light source for color image processing, in particular, for image processing according to a cycolor method.

BRIEF DESCRIPTION OF THE DRAWINGS

FIG. 1 shows a distribution of light emission energy strength of a cathode ray tube having a 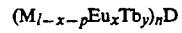$(Y_{1-x-y}Eu_xT$-

Figure 4:
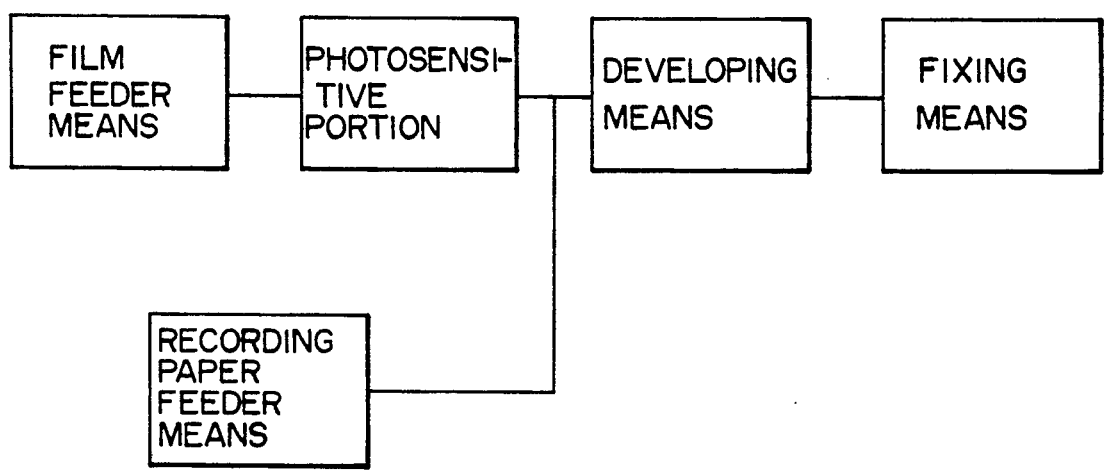

$b_y)_2O_2S$ phosphor, one embodiment of the phosphor of this invention.

FIG. 2 shows a distribution of light emission energy strength of a cathode ray tube having a P45 phosphor ($Y_2O_2S$:Tb).

FIG. 3 shows a distribution of light emission energy strength of a cathode ray tube having a mixture of phosphors.

FIG. 4 is a block diagram showing a color image processing unit using a cathode ray tube having a phosphor of this invention.

DETAILED DESCRIPTION OF THE PREFERRED EMBODIMENTS

The above object can be achieved by the use of the above phosphor as a phosphor to constitute a phosphor surface of a cathode ray tube.

First, the above object is achieved by the use of a phosphor of the above chemical composition formula wherein D is $O_2S$, n is 2 and y is defined by $0.0003 \leq y \leq 0.005$, i.e. a phosphor which is formed by further incorporating europium (Eu) to terbium-activated yttrium oxysulfide or lutetium oxysulfide and has the formula of $(Y \text{ or } Lu_{1-x-y}Eu_xTb_y)_2O_2S$ wherein x is defined by $0.0003 \leq x' 0.01$ and y is defined by $0.0003 \leq y \leq 0.005$. Secondly, it is also achieved by the use of a phosphor of the above chemical composition formula wherein D is $(Al_{1-z}Ga_z)_5O_{12}$, M is Y, n is 3 and y is defined by $0.001 \leq y \leq 0.02$, i.e. a phosphor which is formed by partially substituting Ga for Al of a green-emitting $Y_3Al_5O_{12}$:Tb phosphor and further adding Eu, and has the formula of $(Y_{1-x-y}Eu_xTb_y)_3(Al_{1-z}Ga_z)_5O_{12}$ wherein x is defined by $0.0003 \leq x \leq 0.01$, y is defined by $0.001 \leq y \leq 0.02$ and z is defined by $0 \leq z \leq 1$.

The above phosphors can be easily produced by weighing out required amounts of oxides of material elements, fully mixing them and heating or firing the mixture in air at about 1,000° to 1,400° C. by using a quartz crucible.

When y in the above $(Y_{1-x-y}Eu_xTb_y)_2O_2S$ phosphor is brought into the range of $0.0003 \leq y \leq 0.005$, the light emitted by Tb becomes a spectrum having a distribution of light emission energy strength in both the blue region (wavelength 400–500 nm) and green region (wavelength 520–580 nm). When y is less than 0.0003, the phosphor cannot be put to practical use, since the light emission energy strength with Tb is low. When the y is greater than 0.005, the light emission energy strength with Tb in the blue region is low and the light emission strength with Tb in the green region is high. Hence, the light emission distribution becomes unbalanced in these two regions, and the phosphor cannot be practically used. Further, when the Eu concentration, x, is brought into the range of $0.0003 \leq x \leq 0.01$, it is possible to obtain a distribution of light emission energy strength in the red light emission region (wavelength 600–700 nm) which is well-balanced with the distributions of light emission energy strength with Tb in the blue and green regions. When x is less than 0.0003, the light emission energy with Eu is low. When x is greater than 0.01, the light emission energy with Tb is reduced due to interaction between E and Tb.

As a result, when the value each for x and y in the $(Y_{1-x-y}Eu_xTb_y)_2O_2S$ is adjusted into the above range, it is possible to obtain a phosphor having a well-balanced distribution of light emission energy strength in all of the blue, green and red regions, and a cathode ray tube having a phosphor surface coated with this phosphor can achieve the intended object.

Further, when x, y and z in the phosphor of $(Y_{1-x-y}Eu_xTb_y)_3(Al_{1-z}Ga_z)_5O_{12}$ are adjusted into $0.0003 \leq x \leq 0.01$, $0.001 \leq y \leq 0.02$ and $0 \leq z \leq 1$, respectively, there is the same effect of Eu coactivation as above, and it is also possible to obtain a phosphor having a well-balanced light emission energy strength in the three regions of blue, green and red.

Furthermore, concerning the phosphors of the above two types, when Tb was replaced, or partially replaced, with Pr, or when Eu was replaced, or partially replaced, with Sm, the same effect was also obtained.

A cathode ray tube for a color image processing unit, particularly for a color image processing unit according to a cycolor method is required to have a phosphor surface having substantially equal light emission energy strengths in the three regions of blue, i.e. wavelength of 400–500 nm, green, i.e. wavelength of 520–580 nm and red, i.e. wavelength of 600–700 nm.

The term of the above "substantially equal" means that there is no difference in effect on color processing. More specifically, it means that a cathode ray tube has a light emission surface in which the light emission energy strengths in regions other than the region where the light emission energy strength is the highest are at least ½ times as high as the light emission energy strength in the region where the light emission energy strength is the highest.

A cathode ray tube having such a light emission surface can be produced by forming, according to a customary method, a phosphor surface for the cathode ray tube from a phosphor of the above chemical composition formula of $(M_{1-x-y}Eu_xTb_y)_nD$ wherein M, x, y, n and D have the same meanings as defined above.

A cathode ray tube having a the phosphor of this invention is used as a light source for a cycolor method image processing unit, whereby not only the unit is made compact but also excellent color copies (or color prints) can be provided.

The image processing unit of this invention comprises at least means of feeding a film according to a color copy (or color print) processing rate, a photosensitive portion using the cathode ray tube of this invention as a light source, means of feeding a sheet of copying (or printing) paper, developing means and fixing means.

This invention will be illustrated by reference to Examples, to which, however, this invention shall not be limited.

EXAMPLE 1

Yttrium oxide, europium oxide, terbium oxide and sulfur in predetermined amounts were mixed fully. The, the mixture was charged into a quartz crucible and fired at about 1,000° to 1,400° C. for 2 to 3 hours to give a terbium and europium-coadded yttrium oxysulfide, $(Y_{1-x-y}Eu_xTb_y)_2O_2S$ wherein x and y have the same meaning as defined above.

EXAMPLE 2

A $Y_2O_2S$ phosphor to which 0.1 mol % of each of Eu and Tb was added, $(Y_{1-x-y}Eu_xTb_y)_2I_2S$ where $x = y = 0.001$ was used as a phosphor, and an integrated No. 7-sized bulb to which a panel portion and a funnel portion were attached by thermal fusing (direct sealing) was used as a glass bulb for a cathode ray tube. The bulb was coated with the phosphor according to a precipitation-coating method used for forming phosphor surfaces of usual monochromatic cathode ray tubes or projection-type cathode ray tubes. And, the coated bulb was also subjected to the remaining production steps for usual cathode ray tubes to prepare a cathode ray tube.

FIG. 1 is the distribution of light emission energy strength of the resultant cathode ray tube. FIG. 1 shows that the light emission energy strength was distributed well-balancedly in three regions of blue (wavelength 400-500 nm), green (wavelength 520-580) and red (wavelength 600-700), and particularly that the light emission in the red region was improved to a great extent as compared with the light emission energy strength distribution produced by a Tb-activated P45 phosphor ($Y_2O_2S:Tb$) shown in FIG. 2.

That is, the cathode ray tube of this Example has overcome the imbalance in light emission energy strength distribution which was a problem of cathode ray tubes using the p45 phosphor. Further, the cathode ray tube of this Example has also overcome the non-uniformity of color images and reduction in resolution in color copies and prints which were problems of cathode ray tubes using a mixture of phosphors.

EXAMPLE 3

A cathode ray tube was prepared by repeating Example 2 except that $Y_3Al_5O_{12}$ phosphor to which 0.1 mol % of each of Eu and Tb was added and in which Ga was substituted for 40 mol % of Al, i.e. $(Y_{1-x-y}Eu_xTb_y)_3(Al_{1-z}Ga_z)_5O_{12}$ where x=y =0.001 and z=0.4, was used as a phosphor.

The cathode ray tube obtained above had a satisfactory balance of light emission energy strength in each of the color regions, and had a phosphor surface which exhibited uniform and bright-light emission strength.

EXAMPLE 4

Color copies were made by using a cycolor image processing unit using, as a light source, the cathode ray tube obtained in Example 2. The color copies had excellent color reproduction.

What is claimed is:

1. A cathode ray tube comprising a phosphor surface formed of a single phosphor having a substantially equal light emission energy strength in each of three wavelength regions of 400 to 500 nm, 520 to 580 nm and 600 to 700 nm in the visible radiation region; the phosphor surface being formed of a single phosphor having the following chemical composition formula:

$$(M_{1-x-y}Eu_xTb_y)_nD$$

wherein M represent Y or Lu, D represents $O_2S$, n is 2, x is defined by $0.003 \leq x \leq 0.01$, and y is defined by $0.0003 \leq 0.005$.

2. A cathode ray tube comprising a phosphor surface formed of a single phosphor having a substantially equal light emission energy strength in each of three wavelength regions of 400 to 500 nm, 520 to 580 nm and 600 to 700 nm in the visible radiation region; the phosphor surface being a light emission surface in which the light emission energy strengths in the regions other than the region where the light emission energy strength is the highest are at least ½ times as high as the light emission energy strength in the region where the light emission energy strength is the highest and the phosphor surface being formed of a single phosphor having the following chemical composition formula:

$$(M_{1-x-y}Eu_xTb_y)_nD$$

wherein M represents Y or Lu, D represents $O_2S$, n is 2, x is defined by $0.003 \leq x \leq 0.01$, and y is defined by $0.003 \leq y \leq 0.005$.

3. A cycolor-method color image processing unit using, as a light source, a cathode ray tube recited in any one of claim 1 and 2.

* * * * *